United States Patent [19]
Buzsaki

[11] Patent Number: 5,987,422
[45] Date of Patent: Nov. 16, 1999

[54] METHOD FOR EXECUTING A PROCEDURE THAT REQUIRES INPUT FROM A ROLE

[75] Inventor: George Buzsaki, Fremont, Calif.

[73] Assignee: Oracle Corporation, Redwood Shores, Calif.

[21] Appl. No.: 08/864,850

[22] Filed: May 29, 1997

[51] Int. Cl.⁶ .................................................. B43K 29/00
[52] U.S. Cl. ...................... 705/9; 705/7; 707/1; 707/100
[58] Field of Search ................................ 705/7, 9; 707/1, 707/100, 10, 104

[56] References Cited

U.S. PATENT DOCUMENTS

| | | | |
|---|---|---|---|
| 5,319,543 | 6/1994 | Wilhelm | 705/3 |
| 5,768,506 | 6/1998 | Randell | 395/200.32 |
| 5,799,297 | 8/1998 | Goodridge et al. | 707/1 |

*Primary Examiner*—Thomas R. Peeso
*Attorney, Agent, or Firm*—Blakely, Sokoloff, Taylor & Zafman LLP

[57] ABSTRACT

A method for executing a workflow that requires input from a role is disclosed. A workflow is executed in a first process until an operation requiring input from a role is detected. Continuation information is stored indicating the workflow operation requiring input from the role. The request for input from the role is then communicated to a computer-user identified with the role. Later, after receiving input from the computer user, execution of the workflow is resumed in a second process based on the continuation information, starting at the operation that required input from the role. The operation that required input from the role is executed based on the response received from the computer-user identified with the role.

26 Claims, 13 Drawing Sheets

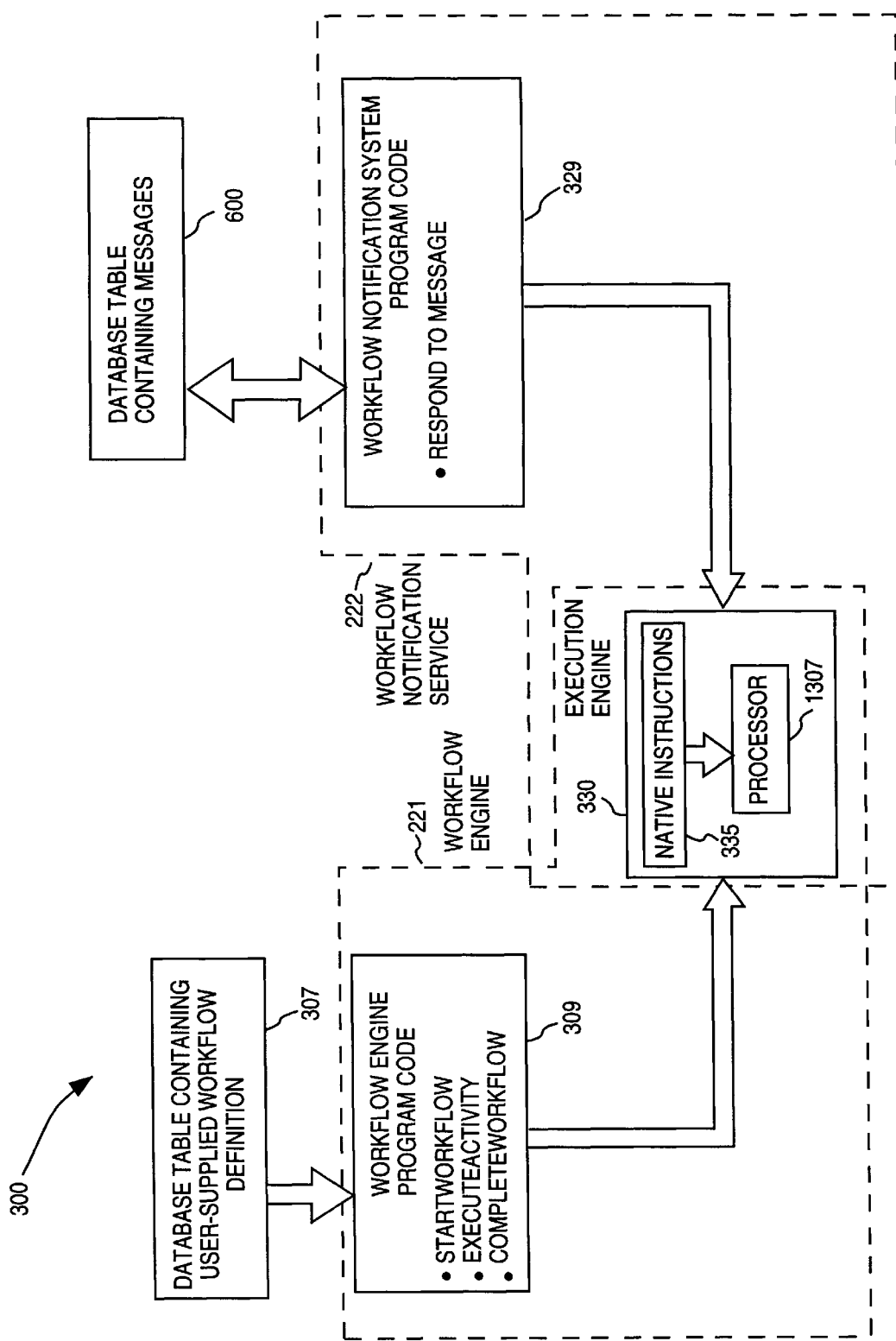

TABLE OF WORKFLOW NAMES ~405

| WORKFLOW NAME ~406 | WORKFLOW DESCRIPTION~ 407 |
|---|---|
| HIRE | WORKFLOW EXECUTED TO PROCESS NEW HIRE |
| ACCOUNT DEBIT | WORKFLOW EXECUTED TO DEBIT ON INTERNAL ACCOUNT |
| REQUISITION | WORKFLOW EXECUTED TO REQUISITION AN ITEM FROM INTERNAL STOCK |
| ⋮ | ⋮ |

TABLE OF WORKFLOW ACTIVITIES ~425

| 426-ACTIVITY NAME | 427-IMPLEMENTING FUNCTION | WORKFLOW NAME~428 | ATTRIBUTES~429 |
|---|---|---|---|
| ⋮ | ⋮ | ⋮ | ⋮ |
| SELECT APPROVER | | REQUISITION | |
| ⋮ | ⋮ | ⋮ | ⋮ |

TABLE OF WORKFLOW TRANSITION LOGIC ~445

| ACTIVITY NAME~ 446 | BRANCH ACTIVITY~ 447 | BRANCH CONDITION~ 448 |
|---|---|---|
| CHECKINVENTORY | NOTIFYFILLED | REQUISITIONED ITEM IN STOCK |
| CHECKINVENTORY | NOTIFYBACKORDERED | REQUISITIONED ITEM NOT IN STOCK |
| ⋮ | ⋮ | ⋮ |

WORKFLOW DEFINITIONS

FIG. 4

| ITEM ACTIVITY STATUS TABLE | | | | | | | |
|---|---|---|---|---|---|---|---|
| WORKFLOW NAME | WORKFLOW INSTANCE | WORKFLOW ACTIVITY | ACTIVITY STATUS | ACTIVITY RESULT | ROLE | MESSAGE ID | ERROR ENCOUNTERED |
| 505 | 510 | 515 | 520 | 525 | 530 | 535 | 540 |

FIG.5

METHOD FOR EXECUTING A PROCEDURE THAT REQUIRES INPUT FROM A ROLE

BACKGROUND OF THE INVENTION

(1) Field of the Invention

The present invention relates to the field of computer science. More specifically, the present invention relates to a method for executing a procedure that requires input from a person other than an immediate user.

(2) Art Background

Modem business procedures often require different types of information to be routed to different people according to a pre-defined set of rules. Computers are ideal for automating these procedures, referred to as "workflows", for a number of reasons. First, communication between computers via the Internet and enterprise intranets have made information exchange efficient and inexpensive, even for geographically distributed enterprises. Second, many common business functions such as account management and inventory management are already performed by computers. By networking the computers that perform such business functions with computers used to automate workflows, it becomes possible to perform common business functions as part of a workflow execution. Finally, a workflow is similar to a computer program in that, once defined, a single copy of the workflow definition can be copied or downloaded for execution on multiple machines. By using the same workflow definition throughout an enterprise, compatibility and consistency between enterprise business procedures can be significantly Execution of a workflow generally takes place in the background without any user interaction until communication with a role is required. Herein, the term "role" refers to one or more persons that must be notified in order to complete a particular operation within a workflow. For example, one common workflow role is an approver role. In order to execute an approval operation, an individual identified with the corresponding approver role must be notified to either approve or reject a request. That is, input must be received from the approver role. Another role that appears in many workflow processes is a requester role. Any individual that initiates a workflow process seeking a response from another individual or from an automated function fulfills a requestor role. Most workflow processes include at least one operation in which a requestor role is notified.

Executing a procedure that requires input from a role presents certain difficulties. One difficulty arises from the fact that a role cannot be expected to be present to respond when prompted for input. This is in contrast to a typical foreground processing application in which an immediate user is assumed, i.e., a user is assumed to be present and ready to supply input in response to a pop-up message, dialog box or other prompt.

Since a role cannot be expected to respond timely to a request for input, an issue arises as to what the requesting process should do while the request is pending. Of course, the process could block until the role responds to the request for input. However, it could be days or even weeks before the role responds. Since even blocked processes require system resources (e.g., stack, code and data space), this type of long-term process blocking can be wasteful.

Another problem, also arising from the fact that the role is not an immediate user, is the logistical problem of communicating the request for input to the role and receiving a response from the role. The process requesting input from a role is unlikely to be executing on the role's computer so that foreground prompting is usually not an option. Also, while networked computers can be programmed to provide a remote user-interface, there can be no assurance that the role's computer is networked to the computer executing the requesting process at the time the request for input is issued.

The difficulties that arise when a process must receive input from a role extend to background processing generally. Consequently, in the traditional background processing model, background processes are executed without user input beyond the initial input parameters. When processing activities are completed or errors are encountered, these events are recorded in an execution log. The execution log can be inspected from time to time to determine whether events of interest have occurred.

There are several disadvantages to the traditional background processing model. First, instead of being automatically notified when background processing events occur, users are effectively required to poll the execution log. Second, when the background process encounters an error, it may have to terminate since it has no mechanism for asking a user what corrective action should be taken. This can be wasteful, particularly when the error is encountered toward the end of a long process. Finally, the traditional approach to background processing limits the types of programs that can be executed in the background to those which require no user-input.

It would be desirable to provide a generalized method for detecting a request for user input in a procedure being executed in a background process, communicating the request to a user identified in the request, and then completing the procedure when the user supplies the requested input. Such a method could also be applied to support execution of a procedure that requires input from a role.

BRIEF SUMMARY OF THE INVENTION

A method for executing a workflow that requires input from a role is disclosed herein. In response to a request from a computer-user, a workflow is executed in a first process until an operation requiring input from a role is detected. The first process then stores a message in a message database indicating that input is needed from a role. In addition, the first process stores continuation information in the message database indicating a point at which execution of the workflow should resume. This point is typically at the workflow operation requiring input from the role. The first process then proceeds to perform other operations in the workflow not requiring input from the role (if there are any such operations) and terminates. Later, when a computer-user identified with the role executes a computer program to connect to a network of computers including a computer containing the message database, a second process is started. The second process communicates the message indicating a request for input to the computer-user identified with the role. After the computer-user identified with the role responds with input, the second process resumes execution of the workflow at the point indicated by the continuation information (i.e. at the operation requiring input from the role), and executes that operation based upon the input from the computer-user identified with the role. In this manner, execution of the workflow is resumed. By carrying out the steps described above, input from a role is solicited and processed in a smooth and efficient manner.

BRIEF DESCRIPTION OF THE DRAWING

The features and advantages of the present invention will be more fully understood by reference to the accompanying drawing, in which:

FIG. 3 illustrates a workflow engine and a workflow notification system according to one embodiment of the present invention.

FIG. 4 illustrates database tables used to store workflow definitions.

FIG. 5 illustrates an item activity status database table.

DETAILED DESCRIPTION OF THE INVENTION

A method for executing a procedure that requires input from a role is described below. Although numerous specific details are set forth in order to provide a thorough understanding of the present invention, it will be apparent to one skilled in the art that the present invention may be practiced without such specific details. For example, while the term "workflow" refers to any procedure that can be automated, a business procedure is used as an exemplary workflow for much of the following discussion. It will be readily appreciated that other types of workflows can be executed using the method of the present invention.

Terminology

The terms "process" and "application program" occasionally appear in the following description of the present invention. Herein the term "process" refers to an instance of an executing computer program and the term "application program" refers to a sequence of instructions which, when executed in a process, carry out a particular function intended by the user of the application program. In most cases an application program will include sequences of instructions which, when executed, invoke services of an operating system. The application program is said to be mounted on the operating system and to be executing in an environment established by the operating system. An application program may involve execution of multiple processes (a multiprocessing application), multiple threads (a multithreaded application), or both.

It is common parlance in the computer science field to speak of software, in one form or another (e.g., program, procedure, application . . . ), taking an action or causing a result. Such expressions, which occasionally appear herein, are merely a shorthand way of saying that execution of the software by a machine results in an action being taken or a result being caused.

Workflow Diagram

Figure 1:
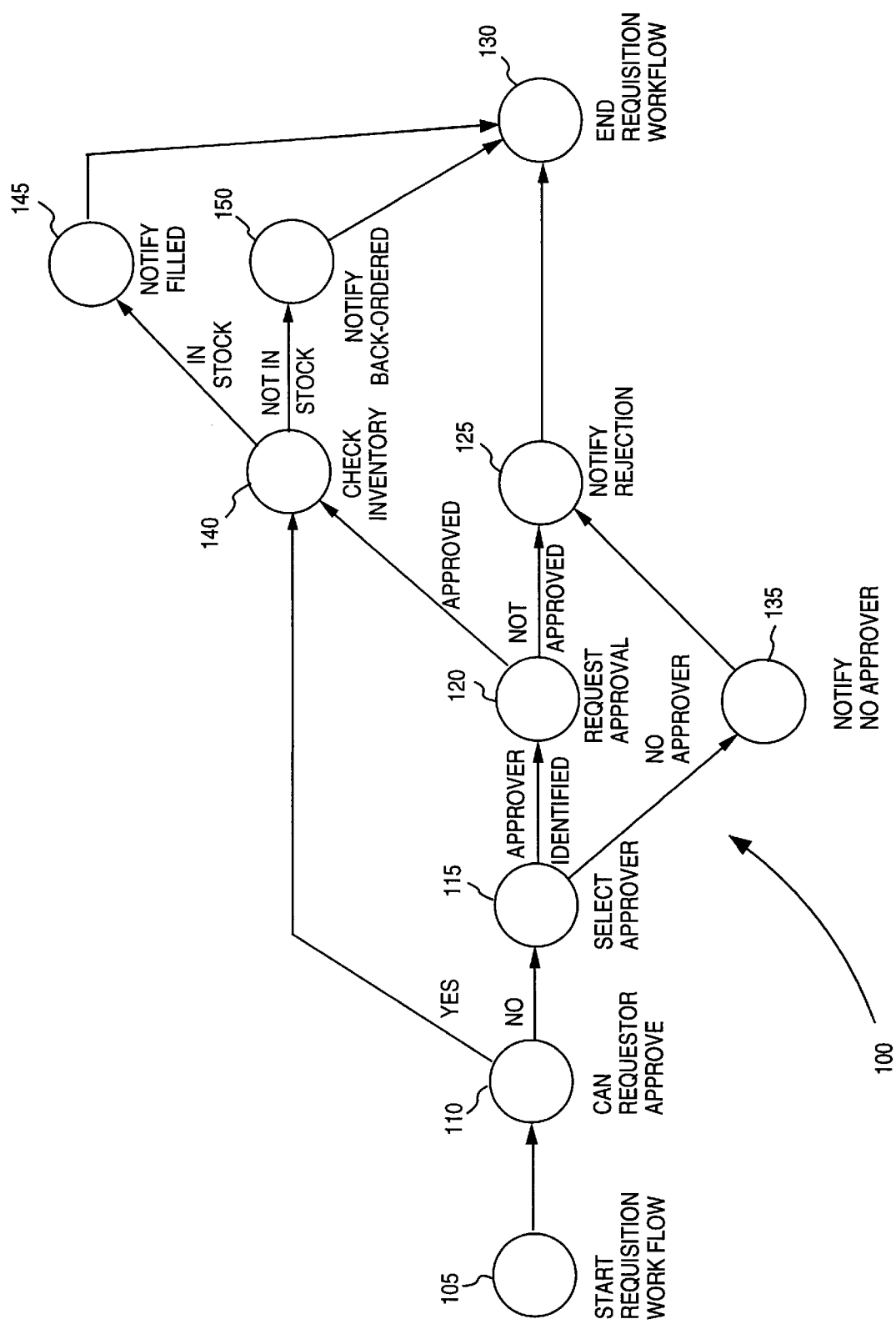
FIG. 1 illustrates a requisition workflow.

FIG. 1 is a diagram illustrating a workflow 100 for processing a requisition. Like all workflows, the requisition workflow can be described in terms of activities to be performed and transitions between the activities. The activities indicate operations to be performed by the program executing the workflow and the transitions indicate the conditional and unconditional branches to be taken to subsequent activities. An unconditional branch is followed after every execution of its preceding activity, while a conditional branch is followed only if a condition (usually established by execution of the preceding activity) is satisfied.

The workflow 100 illustrated in FIG. 1 begins with a start activity 105 called "StartRequisitionWorkflow". A start activity is essentially a place holder indicating to the workflow program where to find the starting activity for a named workflow. The StartRequisitionWorkflow activity 105 transitions to an activity called "CanRequestorApprove" 110. The CanRequestorApprove activity 110 is used to determine whether the requestor can self-approve the requisitioned item. If so, the workflow transitions to the "Checkinventory" activity 140 and if not, the workflow transitions to the "SelectApprover" 115 activity. At the SelectApprover activity 115, an attempt to identify an approver is made. If an approver is identified, execution of the workflow transitions to the RequestApproval activity 120 where an approver is notified and requested to supply input either approving or rejecting the requisition. If the requisition is approved, workflow execution transitions to the CheckInventory activity 140. If the requisition is not approved, the workflow transitions to a NotifyRejection activity 125 to notify the requestor that the requisition has been rejected. Also, if, at the SelectApprover activity 115, no approver is identified, the workflow transitions to a NotifyNoApprover activity 135 to notify the requestor that no approver was identified, and then to the NotifyRejection activity 125. After the requester has been notified of the rejection, the workflow is terminated at the end requisition workflow activity 130.

To execute the CheckInventory activity 140, a computer-maintained inventory is queried to determine whether the requisitioned item is in stock. If so, the workflow transitions to a NotifyFilled activity 145 to notify the requestor that the requisition has been filled, then the workflow is ended at the EndRequisitionWorkflow activity 130. Similarly, if the requisitioned item is not in stock, a NotifyBackOrdered activity 145 is executed to notify the requestor that the requisitioned item has been back-ordered, then the workflow is ended at the EndRequisitionWorkflow activity 130. Like the StartRequisitionWorkflow activity 105, the EndRequisitionWorkflow activity 130 is essentially a place holder used to indicate the end of the Requisition workflow 100 to the workflow engine.

Execution of workflow 100 requires communication with at least one role, possibly two: a requester and an approver. In this example, communication with the requestor occurs at activities 125, 135, 145 and 150, while communication with an approver occurs only at the RequestApproval activity 120.

As stated above, communication with a role presents certain difficulties arising from the fact that the role cannot be expected to be present at any one time or at any particular network computer site. For example, the RequestApproval activity 120 may require communication with an approver who is often out of the office and who is able to receive computer communication only through occasional remote connection to the enterprise computer network. To accommodate such an approver, it is necessary to overcome two problems: first, it is necessary to communicate the need for input to the approver; and second, it is necessary to resume execution of the workflow after the approver has responded to the request for approval.

Taking the second problem first, one potential solution is to suspend execution of the input-requesting process until a response is received from the role. While this solution is acceptable for short-term process suspension, system resources continue to be consumed by the suspended process (e.g., memory space remains allocated for the stack, data and code of the suspended process). Since it may take days or even weeks for a role to respond to a request for information, the suspension model may result in considerable system resources being left idle for extended periods of time. The present invention provides a superior solution.

Figure 2:
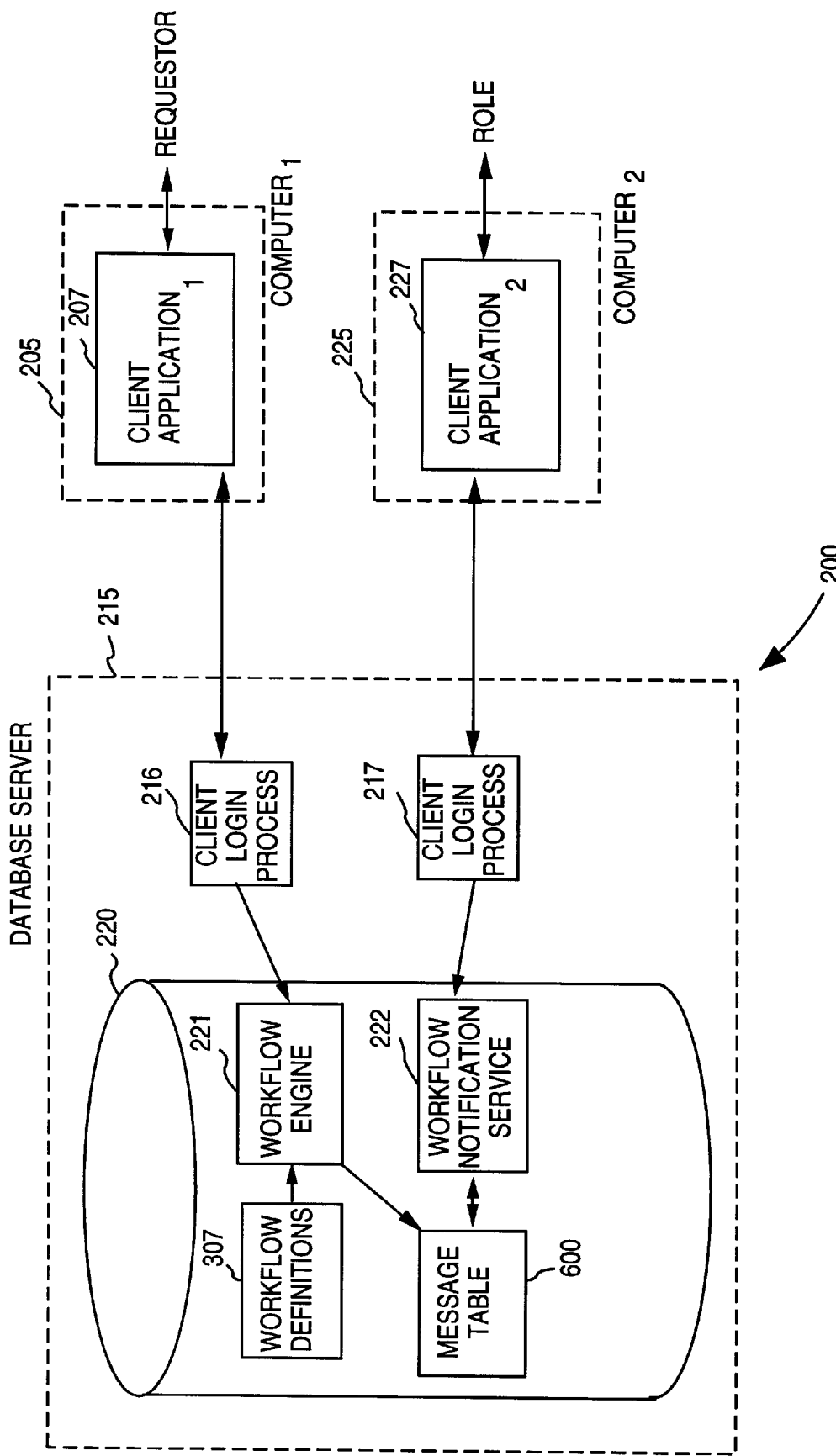
FIG. 2 illustrates a client/server model for executing a workflow.

FIG. 2 illustrates a client/server model 200 according to one embodiment of the present invention that addresses both the need to communicate with a role and the need to resume execution of a workflow after a response is received from the role. The dashed boxes 205, 215, 225 are used to indicate that three different computers may be involved in execution of the workflow: a computer used by the requestor 205 (the "requestor's computer"), a database server 215, and a computer used by the approver 225 (the "approver's computer"). To begin execution of the requisition workflow, the requester invokes a client application 207 to log on to the database server 215. The login request is communicated to the database server 215 by the requestor's computer 205 and causes a client login process 216 to be started on the database server 215. The client login process 216 receives requests from the client application program 207 executing on the requestor's computer 205 and, in response, executes program code stored in a database 220 on the database server 215.

Execution of a workflow is initiated when the requestor submits input to the client application program 207 identifying a workflow. The client application program 207 (i.e., the executing instance of the client application program 207) communicates the request to execute a workflow to the client login process 216. In one embodiment of the present invention, the definitions of various workflows 307 are stored in database 220 along with program code for executing the activities included in the workflow definition 307. The program code executed to carry out the activities included in the workflow definition 307 is referred to as "workflow engine program code" and, when executed, constitutes a virtual machine referred to as a workflow engine 221. In one embodiment of the present invention, the client login process 216 executes workflow engine program code to implement workflow engine 221 which, in turn, executes the activities included in a workflow definition 307. When an activity that requires communication with a role is encountered, a message addressed to the role is written to a message table 600 for later reference by the workflow notification service 222.

Like the workflow engine 221, the workflow notification service 222 is a virtual machine for operating on data stored in certain tables in database 220, including message table 600. When the workflow engine 221 determines that a message must be sent to a role, workflow engine 221 writes a role-addressed message to the message table 600 including information indicating where to resume execution of the workflow after a response is received from the role. This information, referred to herein as "continuation information", is described in greater detail below.

After the workflow engine 221 encounters an activity that cannot be completed without input from a role, the workflow engine 221 may continue to execute parallel flows defined by the workflow until execution of each parallel flow is either completed or awaiting input from a role. Referring to FIG. 1, for example, the workflow may be defined so that the CheckInventory activity 140 is executed in parallel with the approval activities (110, 115 and 120) so that execution of the CheckInventory activity 140 could be continued even though the approval path is stalled waiting for input from the role. In a preferred embodiment of the present invention, the workflow engine 221 is halted after executing all of the parallel flows of a given workflow to completion or to a point at which input from a role is required. After the workflow engine 221 is halted, the client login process 216 in which the workflow engine was executed may be terminated.

Referring again to FIG. 2, the role will eventually connect to the database server 215 using a client application program 227. As described below, the client application program 227 may be an e-mail program coupling to the database server via a mail server (the mail server is not shown in FIG. 2) or a web browser coupled to the database server via a web server (the web server is not shown in FIG. 2). As with the application program 207 invoked by the requestor, the client application program 227 invoked by the role logs on to the database server 215, causing a second client login process 217 to be started. The second login process 217 executes workflow notification service program code to implement the workflow notification service 222. The workflow notification service 222 inspects the list of messages stored in the message table 600 to locate role-addressed messages. The second login process 217 communicates any role-addressed messages stored in the message table 600 to the client application program 227 so that they can be viewed by the role. When the role receives an input-requesting message, the role supplies the requested input in a response. The role's response is communicated to the client login process 217 which then executes workflow engine program code stored in database 220 and indicated by the continuation information stored in the role-addressed message. Execution of the workflow engine program code indicated by the continuation information causes execution of the workflow to be resumed at the activity in which role-input was required. The response from the role is then used to complete the activity and execution of the workflow proceeds to the subsequent activities. Thus, the client/server model 200 of FIG. 2 is used to allow a workflow started by one process, and which requires input from a role, to be completed by a second process after a response has been received from the role.

FIG. 3 is a diagram 300 illustrating an implementation of the workflow engine 221 and the workflow notification service 222 according to one embodiment of the present invention. Workflow engine 221 is implemented by execution of workflow engine program code 309 and is itself used to execute user-supplied workflow definitions stored in table 307. As shown in FIG. 3, workflow engine program code 309 is executed by an execution engine 330. In one embodiment of the present invention, the execution engine 330 is an embedded language subsystem implemented by execution of compiled machine code 335 by processor 1307. The embedded language subsystem executes the workflow engine program code 309 by interpreting the workflow engine program code from a predefined format (e.g., sequence of platform-independent byte-codes) into native machine instructions which are then executed by the processor. It will be appreciated that, in an alternate embodiment, the execution engine could be a processor and the workflow engine and workflow notification service program code could be compiled machine code. In a preferred embodiment of the present invention, execution engine 330 is a PL/SQL™ engine and the workflow engine program code 309 is compiled PL/SQL code. PL/SQL is a trademark of Oracle Corporation.

Just as machine code 335 is executed by processor 1307 to implement an execution engine 330, workflow engine program code 309 is executed by execution engine 330 to implement workflow engine 221. As stated above, workflow engine 221 constitutes a virtual machine for fetching workflow definitions from database table 307 and executing the indicated workflow activities.

The workflow notification service 222 is also a virtual machine implemented by execution of program code in execution engine 330. As shown in FIG. 3, execution engine 330 fetches and executes workflow notification service program code 309 to operate on data stored in message table 600. Although workflow engine 221 and notification service 222 are depicted in FIG. 3 as sharing execution engine 330, workflow engine 221 and notification service 222 may also have distinct execution engines.

FIG. 4 depicts three workflow definition tables used to hold workflow definitions according to one embodiment of the present invention: a table of workflow names 405, a table of workflow activities 425, and a table of workflow transition logic 445. In one embodiment of the present invention, a workflow definition also includes one or more functions or procedures 449 stored in the database (e.g., element 220 of FIG. 2). The table of workflow names 405 includes a workflow name column 406 and a workflow description column 407. The workflow name column 406 contains respective entries identifying each workflow that can be executed in a workflow system and the workflow description column contains workflow descriptions corresponding to the workflow name entries. While the entries in the table of workflow names column 406 of table 405 are shown as being text-based, other types of workflow identifiers may also be used.

The table of workflow activities 425 includes an activity name column 426, an implementing function column 427 and a workflow name 428 column and an activity attribute column 429. The table of workflow activities contains respective entries for each of the activities included in a workflow identified in the table of workflow names. For example, since the table of workflow names 405 includes a requisition workflow (and assuming that the requisition workflow includes the activities described in reference to FIG. 1), the table of workflow activities would include respective entries for activities StartRequisitionWorkflow, CanRequestorApprove, SelectApprover, and so forth. The names of the various activities are listed in the activity name column 426, and respective values each identifying a function 449 to be called to execute a named activity are stored in the implementing function column 427. The name of the workflow to which the activity belongs is stored in the workflow name column 428, and the activity attributes column 428 is used to store information further characterizing a named activity.

The table of workflow transition logic 445 includes an activity name column 446, a branch activity column 447, and a branch condition column 448 for each activity listed in each workflow. Table 445 includes respective entries for each branch leading from each of the activities listed in the table of workflow activities 425. The activity name column 446 identifies the activity which precedes the branch activity listed in branch activity column 447. Branch condition column 448 contains the condition, if any, evaluated to determine whether a branch is to be taken. For each activity in a given workflow, the number of entries in the table of workflow transition logic 445 is equal to the number of branches leading from that activity. Thus, the CheckInventory activity of FIG. 1 (element 140) is listed twice in the table of workflow transition logic 445. The branch activities corresponding to activity CheckInventory are activity NotifyFilled and activity NotifyBackOrdered (elements 145 and 150, respectively, of FIG. 1). As shown in FIG. 4, table 445, the branch condition for branch activity NotifyFilled is that the requisitioned item is in stock, while the branch condition for activity NotifyBackOrdered is that the requisitioned item is not in stock.

Item Activity Status Table

FIG. 5 depicts an Item Activity Status (IAS) database table in which status information is maintained during execution of a workflow. Herein, execution of a workflow according to a workflow definition is referred to as a workflow instance. Multiple instances of a workflow based on the same workflow definition may exist at once. This would be the case, for example, if multiple requestors initiated execution of a requisition workflow within a given time interval. Each instance of the workflow would be distinct and related to the item requisitioned by the requestor, but each workflow instance would be based on execution of the same workflow definition.

The IAS table 500 is used to store information describing the activities executed in a workflow instance. Each time a workflow activity is executed, an entry is added to the IAS table 500. The IAS table 500 includes columns containing information respectively identifying the workflow name to which the executed activity corresponds 505, the workflow instance in which the activity is executed 510, the name of the workflow activity 515, the status of the workflow activity 520, the result of the workflow activity 525, a role to be communicated with 530, the ID of a message stored in a message table 535 and an error encountered during execution of the activity 540. The activity status column 520 of the IAS table is used to indicate whether an activity is presently being executed, has completed execution or is awaiting input from a role. The activity result column 525 is used to indicate the conditional result of the activity, if any. For example, after execution of the CanRequestorApprove activity (element 110 of FIG. 1), the activity result column 525 would contain an entry for that activity indicating either "yes" or "no". As stated above, the role column 530 is used to indicate a role that must be communicated with to complete the activity. Referring to the activities of FIG. 1, for example, the role listed for the NotifyNoApprover activity 135 would be the requester, while the role listed for the RequestApproval activity 120 would be an approver. Returning to FIG. 5, the message ID column 535 of IAS table 500 is used to identify messages stored in the message table of the workflow notification service. As stated above, a message is stored in the message table of the workflow notification service whenever an activity requiring communication with a role is required. The message may merely notify the role that an event has occurred, or may request the role to supply input. Finally, the error column 540 is used to identify errors encountered during execution of the workflow activity. This information is useful for troubleshooting a failed workflow.

Message Table

Figure 6:
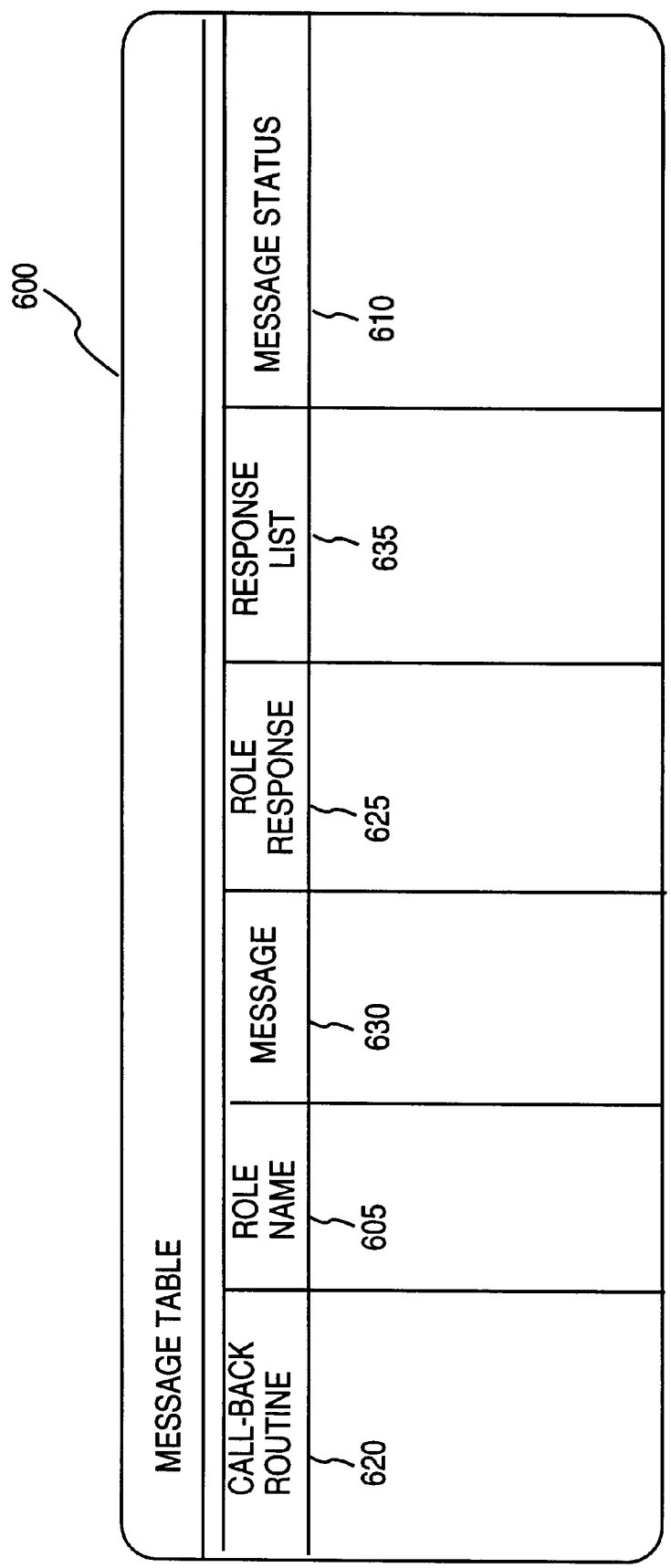
FIG. 6 illustrates workflow notification system message table.

FIG. 6 depicts a workflow notification service message table 600 used to store a message to a role, including continuation information for resuming execution of the workflow activity in which the message originated. The message table 600 includes a column 605 containing information identifying the name of the role to which a given message is addressed, a column 630 containing a message (or a pointer to a message) addressed to the role, and a column 620 identifying a call-back routine to be invoked to resume execution of a workflow when a response from the role is received. The message table 600 also includes a column 625 for storing the response from the role, a column 630 in which the message to the role, or a pointer to the message is stored, a column 635 containing a list of possible role responses, and a message status column 610 indicating whether or not the role has responded to the message.

In one embodiment of the present invention, the information recorded in the call-back routine column 620 constitutes the continuation information discussed above in reference to FIG. 2 and includes the name of a workflow procedure to be called along with arguments indicating a workflow name, workflow instance, and workflow activity. Together with the role response (stored in the role response column 625), the continuation information is used to resume execution of a workflow. The message and response list columns, 630 and 635, are accessed by an electronic mail server, web server or other application program via a client login process to obtain the message and list of valid responses-for the role. As discussed below, a direct access application program may also be used to access messages stored in message table 600.

It will be appreciated that while message table 600 is described as being a single table, multiple tables may also be used. For example, message column 630 might be used to identify a message having a number of attributes, such as an approval total, the name of the person seeking the approval, a comment field and so forth. These attributes could be stored in fields of an attribute table that is keyed by a message index. The message index could then be used to cross-reference a given set of message attributes with a message stored in message table 600.

Overview of a method according to the present invention

Figure 7:
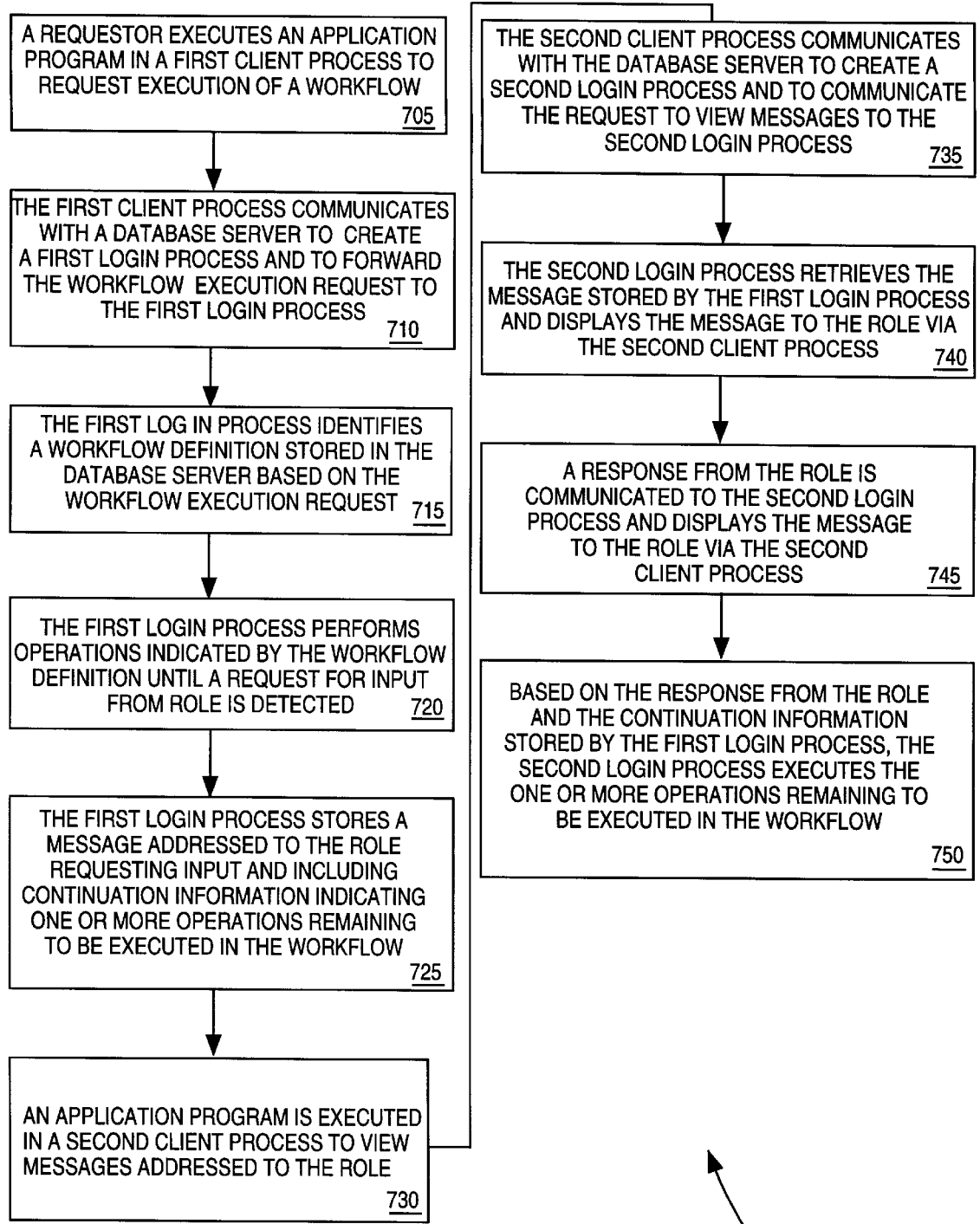
FIG. 7 is a flow diagram of a method for executing a procedure which requires input from a role.

FIG. 7 is a flow diagram 700 of a method for executing a workflow that requires input from a role according to one embodiment of the present invention. At step 705, a first client process is executed in response to a user request to execute a workflow. The first client process communicates with a database server to create a first login process and to forward the workflow execution request to the first login process at step 710. Then, at step 715, the first login process executes workflow engine program code to implement a workflow engine, and the workflow engine identifies a workflow definition stored in the database server based on the workflow execution request. At step 720, the first login process performs operations indicated by the workflow definition until a request for input from a role is detected. At step 725, the first login process stores a message addressed to the role. The message requests input from the role and includes continuation information indicating a point at which execution of the workflow should resume after input is received from the role. In one embodiment of the present invention, the continuation information indicates the workflow activity requiring input from the role.

After step 725 is completed, other parallel flows not dependent upon input from a role may be executed to completion and then the first login process may terminate. Similarly, once the initial request to commence execution of the workflow is communicated to the first login process in step 710, the first client process may also terminate.

At step 730, some arbitrary time after step 725 is completed to store a message addressed to the role, the role executes an application program in a second client process to view messages addressed to the role. At step 735, the second client process communicates with the database server to create a second login process and then communicates the request to view role-addressed messages to the second login process. At step 740, the second login process retrieves the message stored by the first login process and displays the message to the role via the second client process. The role then sends a response to the second login process via the second client process at step 745. As stated above, the response by the role may be selected from a list of responses stored with the message. At step 750, based on the response from the role and the continuation information stored by the first login process, the second login process executes the one or more operations remaining to be executed in the workflow. As stated above, the one or more operations remaining to be executed in the workflow may be indicated in the continuation information by identifying an activity to be executed by the second login process.

Workflow Engine Procedures

According to one embodiment of the present invention, workflow engine program code includes at least three procedures: procedure StartWorkflow, procedure CompleteWorkflow and procedure ExecuteActivity. These procedures are described below in reference to FIG. 8, FIG. 9 and FIG. 10.

Figure 8:
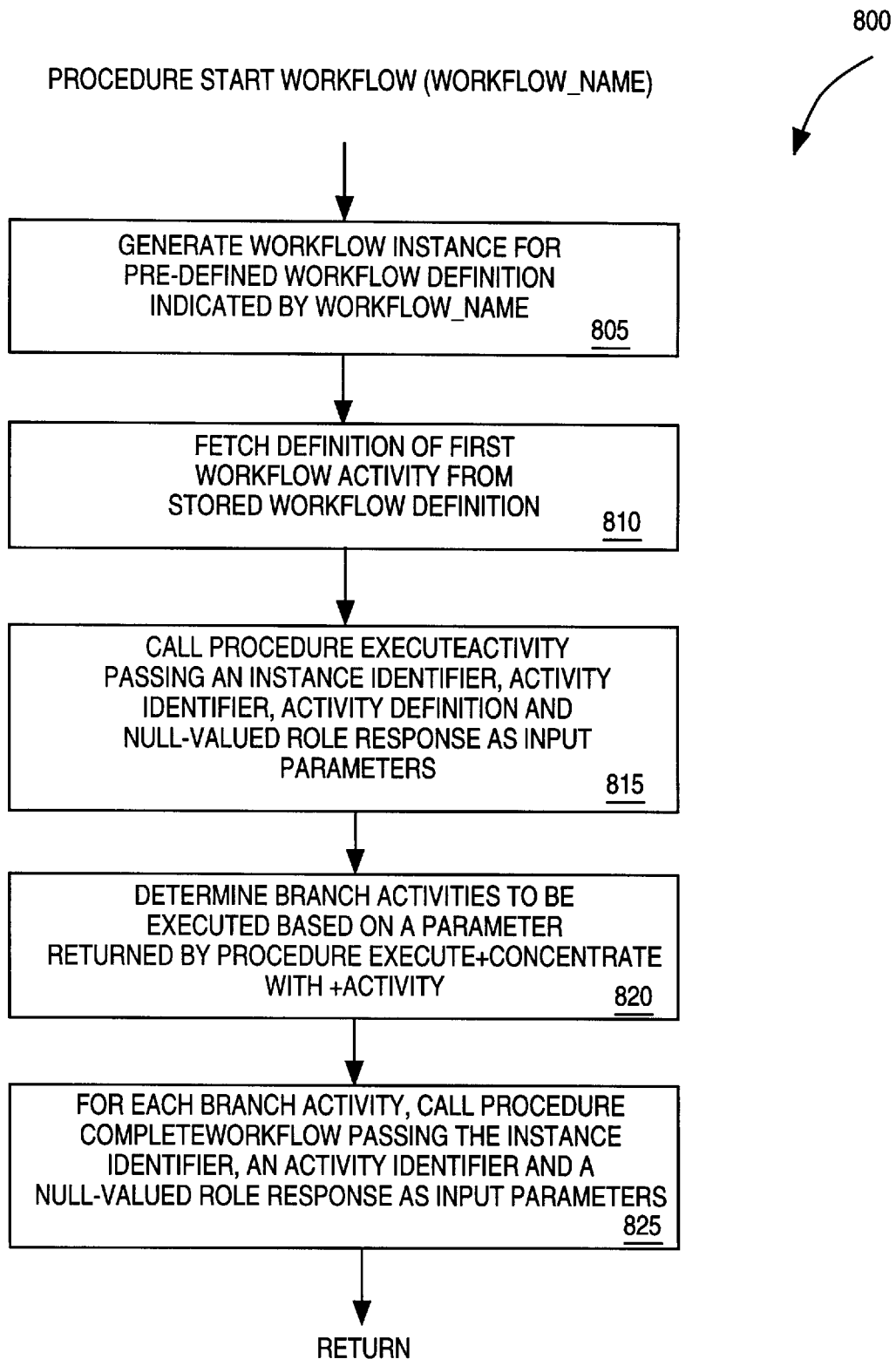
FIG. 8 is a flow diagram for procedure StartWorkflow.

FIG. 8 is a flow diagram 800 of workflow engine procedure StartWorkflow. In one embodiment of the present invention, procedure StartWorkflow is defined by program code included in the workflow engine (element 221 of FIG. 3). Procedure StartWorkflow receives a workflow name or other identifier of a workflow definition as an input parameter and is executed to instantiiate and execute the indicated workflow. As discussed above in reference to FIG. 3, code execution takes place at different levels of the present invention. At a first level, the execution engine included in the workflow engine (element 330 of FIG. 3) may be implemented by execution of compiled machine code by a processor. At a second level, the execution engine executes workflow engine program code to implement the workflow engine (FIG. 3, element 221), and, at a third level, the workflow engine processes user-supplied workflow definitions (element 307 of FIG. 3) to execute workflows. Procedure StartWorkflow, and other workflow engine procedures are executed to implement the workflow engine.

At step 805 of procedure StartWorkflow, a workflow instance is generated (instantiated) for the pre-defined workflow indicated by input parameter, workflow_name. At step 810, the definition of the first workflow activity defined by the workflow is fetched and, at step 815, workflow engine procedure ExecuteActivity is called to execute the activity indicated by the fetched definition. Parameters passed to workflow engine procedure ExecuteActivity include a workflow instance identifier, an activity identifier, the activity definition and a null-valued role response. The manner in which each of the passed parameters is used in procedure ExecuteActivity is discussed below in reference to FIG. 10.

At step 820 of procedure StartWorkflow, the workflow activities to be executed next, referred to as "branch activities" are determined based on a parameter (or parameters) returned by procedure ExecuteActivity. At step 825, workflow engine procedure CompleteWorkflow is called once per branch activity, passing the workflow instance identifier, a branch activity identifier, and a null-valued role response as input parameters. After each call to procedure CompleteWorkflow has returned, procedure StartWorkflow is completed and returns to its caller.

Figure 9:
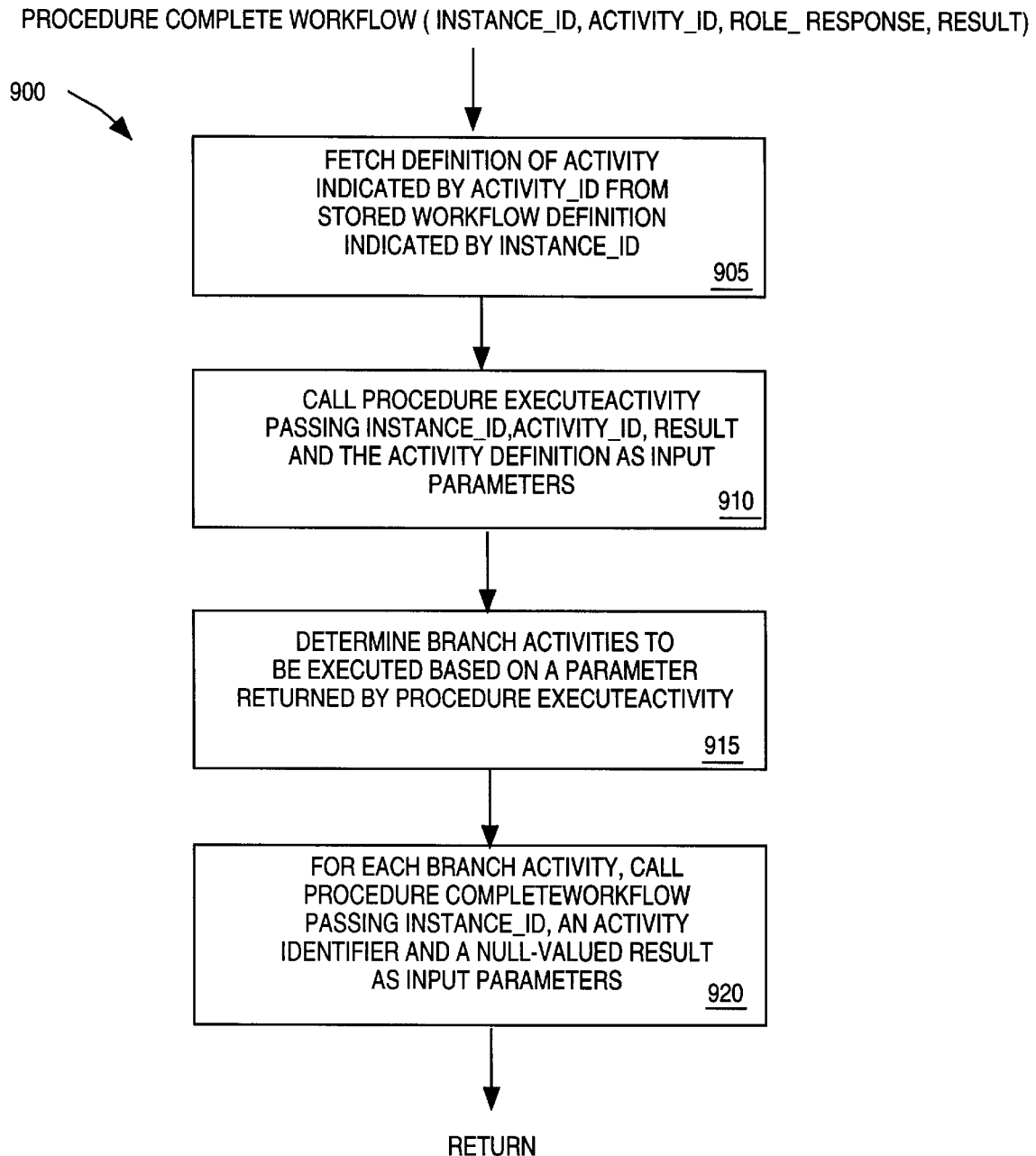
FIG. 9 is a flow diagram for procedure CompleteWorkflow.

FIG. 9 is a flow diagram of workflow engine procedure CompleteWorkflow. Procedure CompleteWorkflow is called by procedure StartWorkflow and, as described below, also by notification service procedure called "Respond". As shown in FIG. 9, procedure CompleteWorkflow receives a workflow instance identifier, an activity identifier and a response from a role (role_response) as input parameters. At step 905 the definition of the activity indicated by parameter activity_id is fetched from the stored workflow definition indicated by parameter instance_id. At step 910, workflow engine procedure ExecuteActivity is called to execute the activity indicated by parameter activity_id according to the activity definition fetched in step 905. Parameters instance_id, activity_id and role_response, as well as the fetched activity definition are passed to procedure ExecuteActivity. As discussed further below, the role_response parameter is used to supply a response from a role, if any, to procedure ExecuteActivity. At step 915, the branch activities to be executed are determined based on a parameter returned by procedure ExecuteActivity. Then at step 920, procedure CompleteWorkflow is called once for each branch activity indicated by the parameter returned by procedure ExecuteActivity. The parameter, instance_id, an activity identifier indicating the respective branch activity and a null-valued role-response are supplied as input parameters to procedure CompleteWorkflow.

It will be appreciated that procedure CompleteWorkflow calls itself in step 920. This is a recursive technique for processing a workflow definition so that, even if activities lead to multiple branches, each branch path (flow) will be processed. It will be appreciated that, in an alternative embodiment, parallel branch paths may be processed without recursive techniques. After step 920 is completed, procedure CompleteWorkflow exits, returning to its caller.

Figure 10:
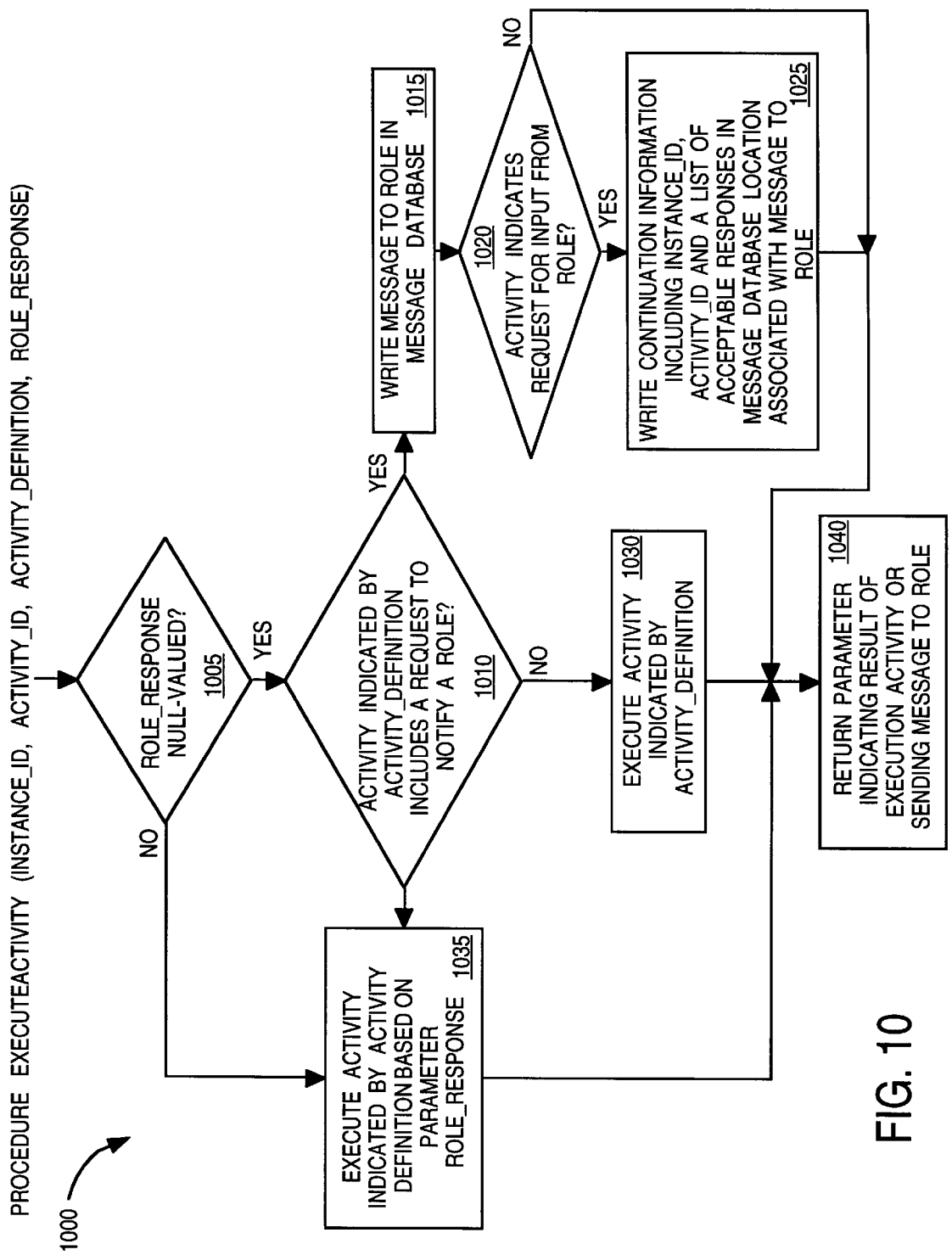
FIG. 10 is a flow diagram for procedure ExecuteActivity.

FIG. 10 is a flow diagram 1000 of workflow engine procedure ExecuteActivity. Procedure ExecuteActivity receives instance_id, activity_id, activity_definition and role_response as input parameters. As discussed above, parameter instance_id identifies a workflow instance and parameter activity_id identifies an activity within the workflow instance. Parameter activity_definition supplies the definition of the activity to be executed. In one embodiment of the present invention, parameter activity_definition is a pointer to the actual definition of the activity. Finally, parameter role_response is used to supply a response received from a role, if any. At step 1005 the role_response parameter is examined to determine if it is null-valued. If parameter role_response is null-valued, it is assumed that no response from a role has been received as input to the activity indicated by parameter activity_id, and execution of procedure ExecuteActivity proceeds to step 1010. At step 1010 the activity definition (indicated by the activity_definition parameter) is examined to determine if the activity includes a request to communicate with a role. If so, then at step 1015 a message addressed to the role is written to the message table in the workflow notification service. At decision step 1020, the definition of the activity is further examined to determine whether input from the role is required. If so, then step 1025 is executed to write continuation information, including the workflow instance identifier (parameter instance_id), the activity identifier (parameter activity_id) into the message table at a location associated with the message to the role. As indicated above in reference to FIG. 6, the workflow name and the name of a procedure to be executed upon receipt of a response from the role may also be stored in the message table. It will be appreciated that the workflow name may be passed into procedure ExecuteActivity or may be looked up using parameter instance_id. Similarly, the name of the procedure to be executed upon receipt of a response from the role may be looked up based on parameters instance_id and activity_id or the name of the procedure may received as an additional input parameter to procedure ExecuteActivity. As discussed further below, in one embodiment of the present invention the procedure to be called upon receipt of a response from a role in all cases is workflow engine procedure CompleteWorkflow.

After step 1025 is executed, procedure ExecuteActivity is exited at step 1040 returning a parameter indicating a result of executing the activity. The returned result after executing step 1025, for example, indicates that no branch activities should be executed because the executed activity will not be completed until the role responds.

If, at decision step 1020, it is determined that no response from a role is required, then procedure ExecuteActivity is exited at step 1040. In such a case the result would simply default to a value indicating that the unconditional branches indicated by the workflow definition should be taken.

If, at step 1010, it is determined that the activity definition does not include a request to notify a role, then the activity indicated by parameter activity_definition is executed at step 1030. If the activity leads to conditional branches, the branches to be taken are determined based on execution of the activity at step 1030 and indicated to the caller in the result parameter returned to the caller when procedure ExecuteActivity is exited at step 1040.

If, at step 1005, the role_response parameter is determined not to be null-valued, parameter role_response is assumed to hold the value of a response from the role. Consequently, at step 1035 the indicated activity is executed based on parameter role_response. As with step 1030, if the indicated activity leads to conditional branches, the conditions are determined based on execution of the activity at step 1035 and the result parameter returned in step-1040 is used to indicate which branches, if any, are to be taken.

Procedure RespondToMessage

Figure 11:
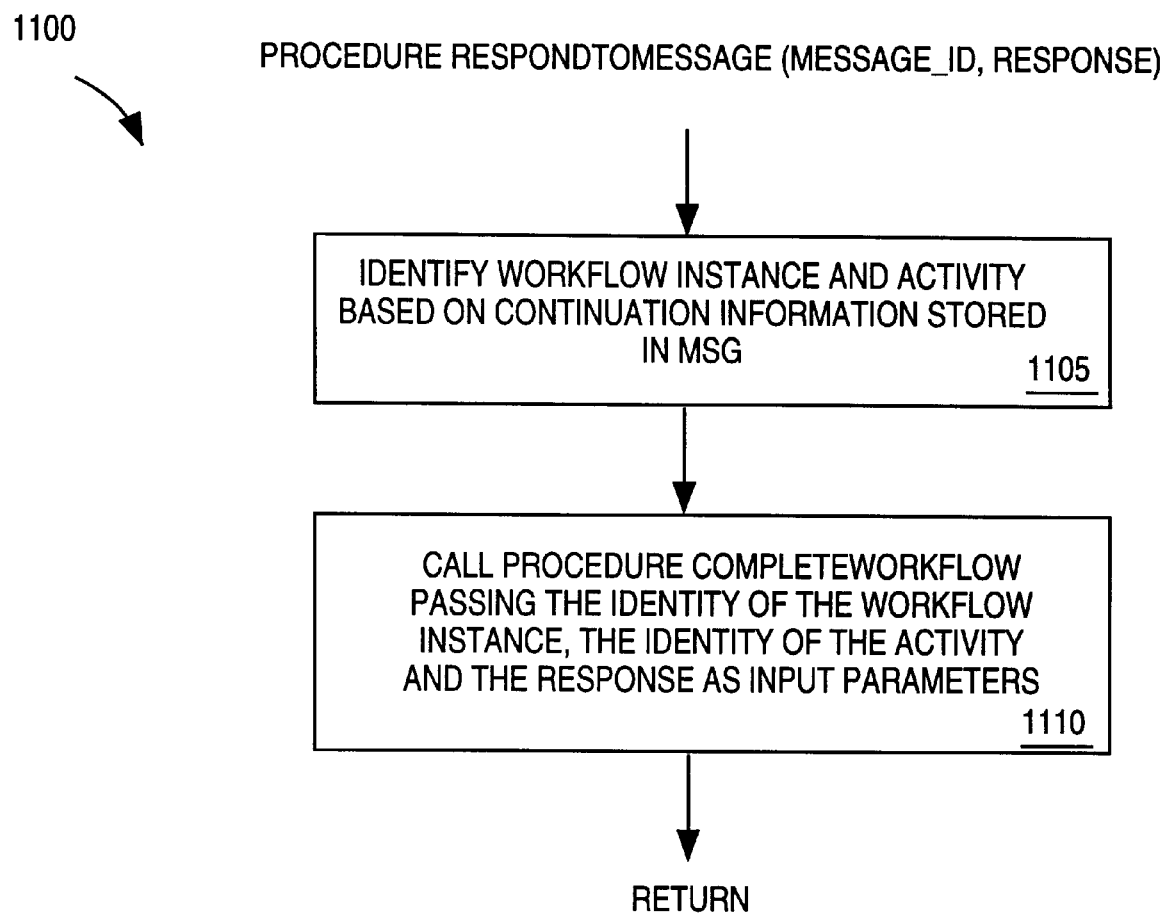
FIG. 11 is a flow diagram for procedure RespondToMessage.

FIG. 11 is a flow diagram 1100 of a workflow notification service procedure called "RespondToMessage". Procedure RespondToMessage is used to resume execution of a workflow that has halted pending response from a role. Procedure RespondToMessage is included with the workflow notification service program code and is invoked when the role responds to the message requesting input. Referring to the client/server diagram of FIG. 2, for example, the client login process 217 invoked by the role via client application program 227 executes procedure RespondToMessage to supply the response from the role to the workflow instance at the activity indicated in the continuation information stored along with the message. Procedure RespondToMessage receives parameters message_id and role_response as input parameters. Parameter message_id is used to locate continuation information stored in the message table in step 1025 of diagram 1000 (procedure ExecuteActivity) and parameter role_response indicates the role's response to the message.

At step 1105 the workflow instance and workflow activity to which the response from the role pertains are identified based on the continuation information stored with the message in step 1025 of diagram 1000. At step 1110, workflow engine procedure CompleteWorkflow is called to resume execution of the workflow indicated by the continuation information. The workflow instance identifier and activity identifier stored in the continuation information are supplied as input parameters to procedure CompleteWorkflow, as is the role_response parameter. Thus, CompleteWorkflow is called by the process used to supply input from the role to resume execution of the workflow partially executed, but not completed, in another process. After executing step 1110, procedure RespondToMessage exits, returning to its caller.

Figure 12:
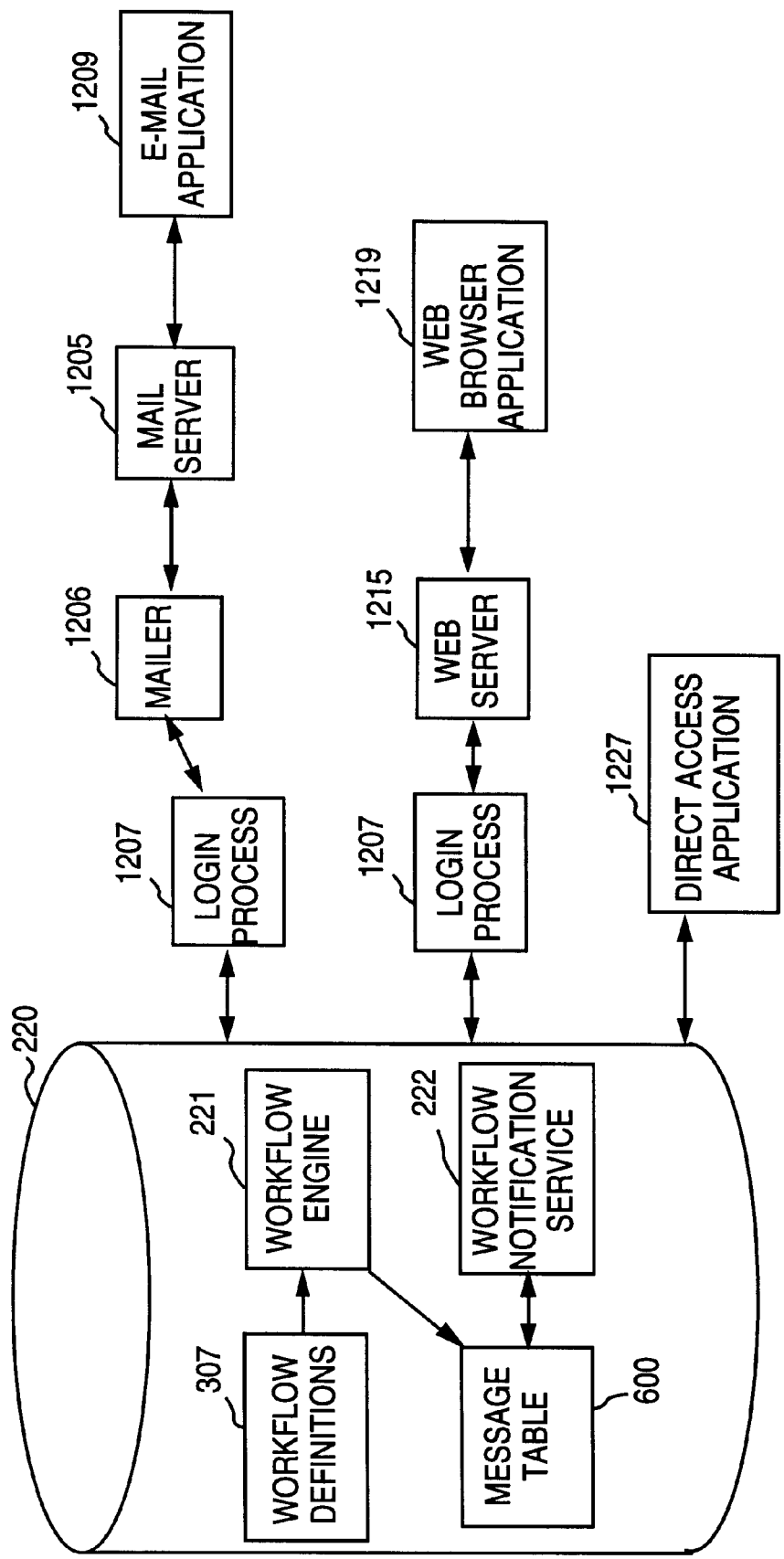
FIG. 12 is a diagram illustrating access to the workflow notification system message table.

FIG. 12 is a diagram illustrating a number of ways that a role can receive and respond to messages stored in message table 600.

Communicating with the Role via E-mail

According to one embodiment of the present invention, a program referred to as a "mailer" 1206 is executed to serve as an intermediary between a conventional mail server 1205 and the workflow notification service 222. When executed, mailer 1206 logs into database 220, creating login process 1207. Mailer 1206 then communicates requests to login process 1207 to determine whether database 220 contains messages addressed to the role. In response, login process 1207 executes notification service 222 program code to query message table 600 for messages addressed to a role. If a role-addressed message is found in message table 600, notification service 222 communicates the message to login process 1207 which, in turn, communicates the message to mailer 1206. Mailer 1206 then calls a standardized interface procedure provided by mail server 1205 to store the role addressed message in mail server 1205. Later, when the role executes electronic-mail application 1209 to view mail messages stored in mail server 1205, the role receives the message. If the message indicates that input from the role is required, the role responds by causing electronic-mail program 1209 to send a return message addressed to the notification service 222 to mail server 1205. The return message is then recorded in mail server 1205.

One of the functions of mailer 1206 is to poll mail server 1205 for messages addressed to the workflow notification service. Consequently, mailer 1206 will detect the response from the role stored in mail server 1205 and forward the response to the notification service via login process 1207. The login process 1207 executes workflow notification service procedure RespondToMessage as described above to resume execution of a workflow indicated by continuation information stored by another process. Execution of the workflow is resumed at the activity which initially indicated a need for input from a role, using the response from the role as input.

Communicating with the Role via Web Browser

A role may also check for messages from the workflow notification service using a web browsing application program 1219 (a "web browser"). The web browser supplies a specialized address known as a "universal resource locator" (URL) to indicate to a web server 1215 that messages addressed to the role should be retrieved from the message database. In one embodiment of the present invention, the URL contains a text string identifying a notification service procedure to be executed to check for messages. In response to receiving the URL, the web server 1215 logs onto the database server 215 in the same manner described above in reference to the mailer 1206, creating login process 1217. Login process 1217 executes URL-identified program code in the notification service 222 to query the message table for messages addressed to the role. Role-addressed messages are then communicated-to the role via login process 1217, web server 1215 and web browser 1219. In one embodiment of the present invention, execution of the URL-identified notification service program code causes hyper-text markup language (HTML) code to be transmitted back to web browser 1219 along with the role-addressed message. The HTML code is used by the web-browser to create a user-interface form in which the role-addressed message is displayed. If the message requires input from the role, the user-interface form may include dialog components to prompt the role for a response.

After being prompted for a response, the role communicates a response to the web server 1215 via web browser 1219, supplying another URL indicating that the message is intended for the workflow notification service 222 and that notification service procedure RespondToMessage is to be executed. The web server 1215 communicates the response to login process 1217 which in turn executes workflow notification service procedure RespondToMessage. As described above, execution of procedure RespondToMessage causes execution of the workflow identified in previously stored continuation information to be resumed at the activity which indicated a request for role input. The response from the role is supplied as input for use during execution of the resumed workflow.

Direct Database Access

As indicated in FIG. 12, another way for a role to respond to messages stored in data base 220, is through a direct access application 1227. A direct access application is a computer program written to directly access tables maintained in database 220, including message table 600. Thus, when invoked by a role, direct access application 1227 queries the message table 600 to determine if it contains role-addressed messages. If so, direct access application 1227 retrieves the message and presents the message to the role in an appropriate user-interface. The role may then respond by supplying requested input. The direct access application 1227 then invokes workflow notification service procedure RespondToMessage supplying the role's response. As described above, execution of procedure RespondToMessage causes execution of the workflow identified in previously stored continuation information to be resumed based on the input from the role.

Computer System Overview

Figure 13:
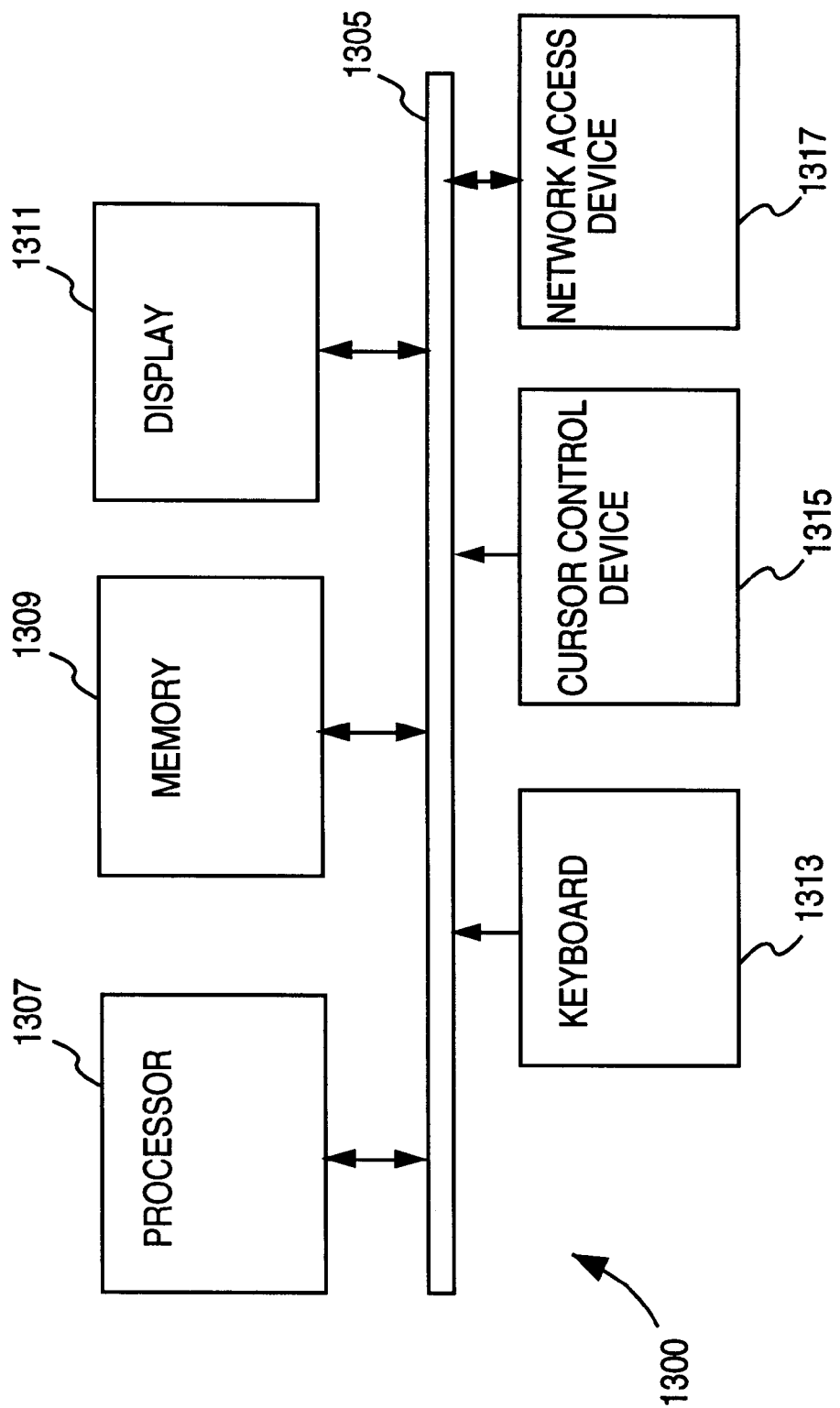
FIG. 13 is an architecture diagram of a computer system that can be used to execute the steps of the method of the present invention.

FIG. 13 depicts a block diagram of a general purpose computer system 1300 for performing the individual steps of the method of the present invention. The computer system 1300 includes a processor 1307, memory 1309, display device 1311, keyboard 1313, cursor control device 1315, and computer network access device 1317 each coupled to a bus 1305. Bus 1305 typically includes an address bus, data bus and control bus (not shown). Cursor control device 1315 may be a mouse, trackball, pen or any other device for manipulating a cursor on display device 1311. Both the cursor control device 1315 and the keyboard 1313 enable the computer system 1300 to receive input from a computer-user. Network access device 1317 may be a modem, network adapter card or any other device for coupling computer 1300 to a computer network. Network access device may be used to generate or receive a carrier wave having a computer data signal encoded therein. The computer data signal can be interpreted to generate program code that may be executed to implement the present invention.

Memory 1309 may include both system memory (e.g., random access memory) and non-volatile storage such as a semiconductor read-only-memory, hard disk-drive, floppy disk-drive, optical disk-drive or any other computer-readable medium. When power is applied to the computer system 1300, program code defining an operating system is loaded from non-volatile storage into system memory by processor 1307 or another device, such as a direct memory access controller (not shown), having access to memory 1309.

Sequences of instructions comprised by the operating system are then executed by processor 1307 to load other computer programs and portions of computer programs into system memory from non-volatile storage. The present invention may be embodied in a sequence of instructions which can be stored in a computer-readable medium and executed by processor 1307. It will be appreciated that both system memory and non-volatile storage may be used to effectuate a virtual memory. In that case, sequences of instructions defining a portion of the operating system or an application program may be kept in non-volatile storage and then moved to system memory when required for execution.

Having described a method for practicing the present invention, it should be noted that the individual steps therein may be performed by a general purpose processor programmed with instructions that cause the processor to perform the recited steps, specific hardware components that contain hardwired logic for performing the recited steps, or any combination of programmed general purpose computer components and custom hardware components. Nothing disclosed herein should be construed as limiting the present invention to a single embodiment wherein the recited steps are performed by a specific combination of _hardware components.

A method and apparatus for executing a procedure that requires input from a role is thus described. While the present invention has been described in particular embodiments and through particular examples, the present invention should not be construed as limited by such embodiments and examples, but rather construed according to the following claims.

What is claimed is:

1. A method for executing a workflow that requires input from a role, the method comprising the steps of:
   executing a workflow in a first process until an operation requiring input from a role is detected;
   storing continuation information indicating the operation requiring input from the role;
   communicating the request for input to a computer-user identified with the role;
   receiving input from the computer-user;
   resuming execution of the workflow in a second process based on the input from the computer-user and the stored continuation information indicating the operation requiring input from the role; and
   wherein said step of communicating the request for input to the computer-user identified with the role includes the steps of
      storing in a data store a message to the computer-user including the request for input,
      the second process polling the data store to retrieve the message,
      the second process communicating the message to a third process executing on a computer providing a user-interface to the computer-user, and
      the third process displaying the message including the request for input to the computer user.

2. The method of claim 1 wherein said step of the second process communicating the message to a third process comprises the step of executing an electronic mail program in the third process to receive the message.

3. The method of claim 1 wherein said step of the second process communicating the message to a third process comprises the step of executing an world wide web browser program in the third process to receive the message.

4. The method of claim 1 wherein said step of the second process polling the data store to retrieve the message comprises the step of receiving in the second process a request to identify messages in the data store addressed to the computer-user.

5. The method of claim 1 wherein said step of executing a workflow in a first process comprises the step of performing one or more sequences of operations indicated by seed data.

6. The method of claim 5 wherein said step of performing one or more sequences of operations indicated by seed data comprises the step of an execution engine interpreting processor-independent instructions to read the seed data and perform the one or more sequences of operations indicated by the seed data.

7. The method of claim 6 wherein said step of an execution engine interpreting processor-independent instructions comprises the step of a processor executing a plurality of processor-native instructions to implement the execution engine.

8. The method of claim 1 further comprising the step of the first process executing other operations defined by the workflow after said step of storing continuation information.

9. The method of claim 1 wherein said step of the second process polling the data store to retrieve the message comprises the second process inspecting a plurality of entries in the data store to identify the message to the computer user.

10. A method for executing a workflow that requires input from a computer-user via an arbitrary one of a plurality of networked computers, said method comprising the steps of:
    executing a workflow in a first process until an operation requiring input from a computer-user is detected;
    storing information indicating one or more operations remaining to be executed in the workflow and a message requesting input from the computer-user;
    executing a second process to deliver the message to the computer-user in response to a request by the computer-user to view messages;
    receiving input from the computer-user in the second process; and
    based on the input from the computer-user, executing in the second process the one or more remaining operations indicated by the continuation information.

11. The method of claim 10 wherein said step of executing a second process to deliver the message to the computer-user in response to a request by the computer-user to view messages comprises the step of receiving the request to view messages from a first computer via a computer network, the first computer generating the request to view messages by executing an electronic mail program in response to a command by the computer-user.

12. The method of claim 10 wherein said step of executing a second process to deliver the message to the computer-user in response to a request by the computer-user to view messages comprises the step of receiving the request to view messages from a first computer via a computer network, the first computer generating the request to view messages by executing a world wide web browser program in response to a command by the computer-user.

13. The method of claim 10 wherein said step of executing a workflow in a first process comprises the step of performing one or more sequences of operations indicated by seed data.

14. The method of claim 13 wherein said step of performing one or more sequences of operations indicated by seed data comprises the step of an execution engine interpreting processor-independent instructions to read the seed data and perform the one or more sequences of operations indicated by the seed data.

15. The method of claim 14 wherein said step of an execution engine interpreting processor-independent instructions comprises the step of a processor executing a plurality of processor-native instructions to implement the execution engine.

16. A computer-readable medium having a plurality of sequences of instructions stored thereon which, when executed by one or more processors, cause said one or more processors to execute a workflow that requires input from a role, said plurality of sequences of instructions including sequences of instructions which, when executed by said one or more processors, cause said one or more processors to perform the steps of:

executing a workflow in a first process until an operation requiring input from a role is detected;

storing continuation information indicating the operation requiring input from the role;

communicating the request for input to a computer-user identified with the role;

receiving input from the computer-user; and resuming execution of the workflow in a second process based on the input from the computer-user and the stored continuation information indicating the operation requiring input from the role; and wherein said step of executing a workflow in a first process comprises the step of executing the workflow in a workflow virtual machine, the workflow virtual machine being implemented by execution of the first process.

17. A computer data signal embodied in a carrier wave and encoding a plurality of sequences of instructions which, when executed by one or more processors, cause said one or more processors to execute a workflow that requires input from a role, said plurality of sequences of instructions including sequences of instructions which, when executed by said one or more processors, cause said one or more processors to perform the steps of:

executing a workflow in a first process until a request for input from a role is detected;

storing continuation information indicating one or more operations defined by the workflow that remain to be executed;

communicating the request for input to a computer-user identified with the role;

receiving input from the computer-user; and executing in a second process the one or more operations indicated by the continuation information based on the input from the computer-user.

18. The computer data signal of claim 17 wherein said step of storing continuation information indicating one or more operations defined by the workflow that remain to be executed comprises the step of storing information indicating an operation to be executed based on the input from the computer-user.

19. The computer data signal of claim 17 wherein said step of executing a workflow in a first process comprises the step of executing the workflow in a workflow virtual machine, the workflow virtual machine being implemented by execution of the first process.

20. An article of manufacture including one or more computer-readable media having a plurality of sequences of instructions stored thereon which, when executed by one or more processors, cause said one or more processors to execute a workflow that requires input from a computer-user via an arbitrary one of a plurality of networked computers, said plurality of sequences of instructions including sequences of instructions which, when executed by said one or more processors, cause said one or more processors to:

execute a workflow in a first process until an operation requiring input from a computer-user is detected;

store information indicating one or more operations remaining to be executed in the workflow and a message requesting input from the computer-user;

execute a second process to deliver the message to the computer-user in response to a request by the computer-user to view messages;

receive input from the computer-user in the second process; and execute in the second process, based on the input from the computer-user, the one or more remaining operations indicated by the continuation information.

21. The article of claim 20 wherein said sequences of instructions which, when executed by said one or more processors, cause said one or more processors to execute the second process to deliver the message to the computer-user comprise instructions which, when executed by said one or more processors, cause said one or more processors to receive the request to view messages from a first computer via a computer network, the first computer generating the request to view messages by executing an electronic mail program in response to a command by the computer-user.

22. The article of claim 20 wherein said sequences of instructions which, when executed by said one or more processors, cause said one or more processors to execute the second process to deliver the message to the computer-user comprise instructions which, when executed by said one or more processors, cause said one or more processors to receive the request to view messages from a first computer via a computer network, the first computer generating the request to view messages by executing a world wide web browser program in response to a command by the computer-user.

23. A computer data signal embodied in a carrier wave and encoding a plurality of sequences of instructions which, when executed by one or more processors, cause said one or more processors to execute a workflow that requires input from a computer-user via an arbitrary one of a plurality of networked computers, said plurality of sequences of instructions including sequences of instructions which, when executed by said one or more processors, cause said one or more processors to:

execute a workflow in a first process until an operation requiring input from a computer-user is detected;

store information indicating one or more operations remaining to be executed in the workflow and a message requesting input from the computer-user;

execute a second process to deliver the message to the computer-user in response to a request by the computer-user to view messages;

receive input from the computer-user in the second process; and execute in the second process, based on the input from the computer-user, the one or more remaining operations indicated by the continuation information.

24. The computer data signal of claim 23 wherein said sequences of instructions which, when executed by said one or more processors, cause said one or more processors to execute the second process to deliver the message to the computer-user comprise instructions which, when executed by said one or more processors to receive the request to view messages from a first computer via a computer network, the first computer generating the request to view messages by executing an electronic mail program in response to a command by the computer-user.

25. The computer data signal of claim 23 wherein said sequences of instructions which, when executed by said one or more processors, cause said one or more processors to execute the second process to deliver the message to the computer-user comprise instructions which, when executed by said one or more processors, cause said one or more processors to receive the request to view messages from a first computer via a computer network, the first computer generating the request to view messages by executing a world wide web browser program in response to a command by the computer-user.

26. A computer system comprising:
one or more processors;
a memory coupled to said one or more processors; said memory having stored therein sequences of instructions which, when executed by one or more processors, cause said one or more processors to execute a workflow that requires input from a computer-user via an arbitrary one of a plurality of networked computers, said sequences of instructions including instructions which, when executed by said one or more processors, cause said one or more processors to:
execute a workflow in a first process until an operation requiring input from a computer-user is detected;
store information indicating one or more operations remaining to be executed in the workflow and a message requesting input from the computer-user;
execute a second process to deliver the message to the computer-user in response to a request by the computer-user to view messages;
receive input from the computer-user in the second process; and
execute in the second process, based on the input from the computer-user, the one or more remaining operations indicated by the continuation information.

* * * * *